Oct. 12, 1926.

J. LANGSTEINER 1,602,495

MILK SAFE

Filed May 22, 1925  2 Sheets-Sheet 1

Joseph Langsteiner, INVENTOR

BY Victor J. Evans

ATTORNEY

Oct. 12, 1926.

J. LANGSTEINER 1,602,495

MILK SAFE

Filed May 22, 1925    2 Sheets-Sheet 2

Joseph Langsteiner
INVENTOR

BY Victor J. Evans
ATTORNEY

Patented Oct. 12, 1926.

1,602,495

UNITED STATES PATENT OFFICE.

JOSEPH LANGSTEINER, OF CHICAGO, ILLINOIS.

MILK SAFE.

Application filed May 22, 1925. Serial No. 32,136.

This invention relates to new and useful improvements in holders and more particularly to a milk bottle holder. The main object of my invention is the provision of a milk bottle safe of the type in which the filled bottles of milk are placed and automatically moved to a closed position and locked to prevent the bottle from being removed from the holder by an unauthorized person.

Another object of my invention is the provision of a milk bottle holder having an opening in one side wall thereof through which a bottle is inserted and includes means whereby the weight of the filled bottle will automatically move the door to a closing position for closing the opening in the body of the holder and at the same time automatically locking the door so as to prevent the same from being opened and the bottle removed by an unauthorized person.

With the above and other objects in view, my invention consists in the novel features of construction and in the combination and arrangement of parts to be hereinafter more fully described, pointed out in the claims and shown in the accompanying drawings, in which:

Figures 1, 4, 6, 7:
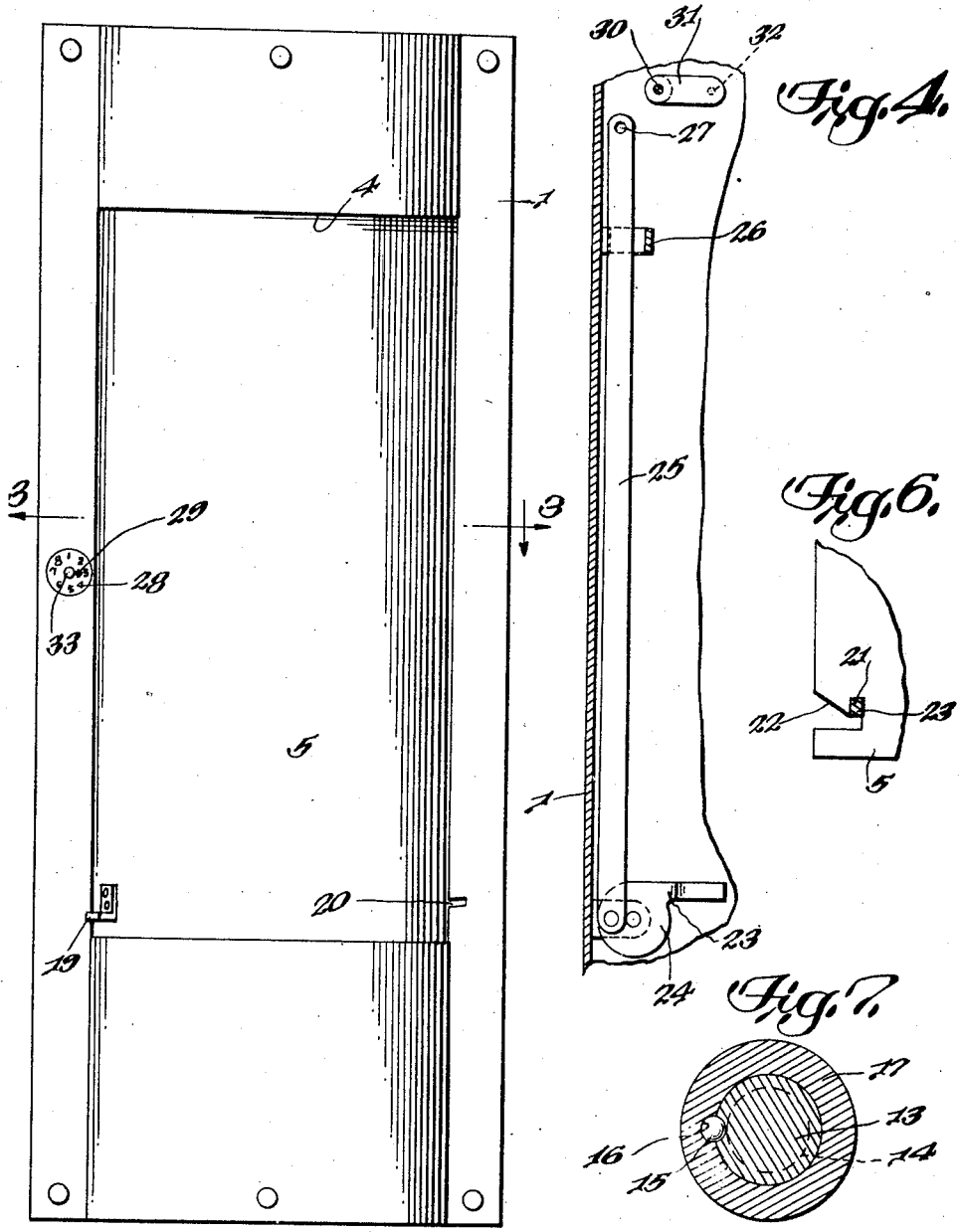
Fig. 1 is a front elevation of a milk bottle holder constructed in accordance with my invention, illustrating the same in a closed and locked position.
Fig. 4 is a detailed transverse section on the line 4—4 of Fig. 3.
Fig. 6 is a detailed section illustrating the engagement of the catch with the door.
Fig. 7 is a detailed transverse section on the line 7—7 of Fig. 2.
Figure 2:
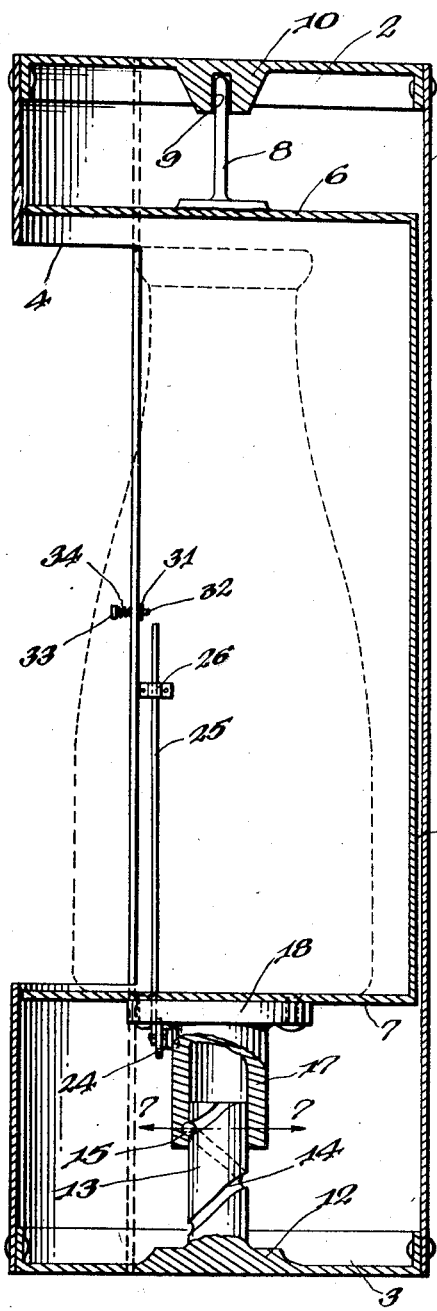
Fig. 2 is a vertical sectional view.
Figure 3:
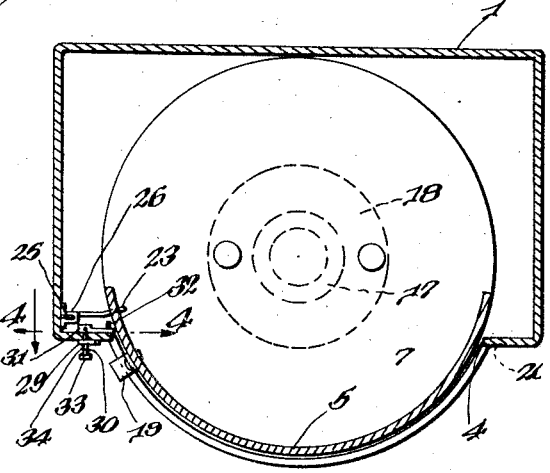
Fig. 3 is a transverse sectional view on the lines 3—3 of Fig. 1.
Figure 5:
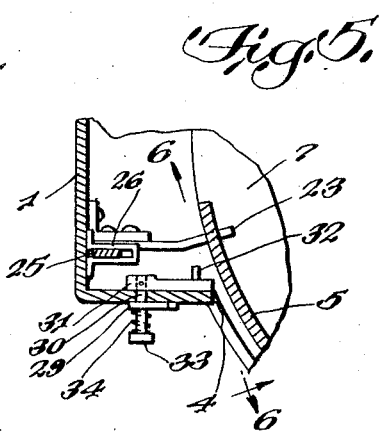
Fig. 5 is a detailed transverse sectional view illustrating the improved locking mechanism.

In carrying out my invention, I provide a metallic housing 1 having a top 2 and bottom 3 for fitting into opposite ends of the housing and secured to the walls thereof in any desirable manner. One side of the housing is provided with an opening 4 which is adapted to be closed by means of an arcuate door member 5, the ends of which are connected to the discs 6 and 7, the upper disc 6 carrying a pin 8 adapted to fit into the bore 9 formed in the boss 10 which is integral with the top 2, whereby to retain the door member in position during rotative movement thereof.

The bottom member 3 carries a central boss 12 and upstanding from this boss is a post 13 having a spiral groove 14 in its periphery adapted to receive a ball 15 which is positioned in a depression 16 in the inner wall of the sleeve 17 whereby through downward movement of the sleeve 17 on the post 13 the ball 15 will be caused to travel in the spiral groove 14 and rotate the sleeve 17 upon the post 13.

The upper end of the sleeve 17 is connected to the disc 7 by means of a plate 18. From this it will be apparent that as the sleeve 17 moves downwardly upon the post 13 the arcuate door member 5 will be moved to a closed position before the opening 4. It will be apparent however that in order to properly actuate the means for rotating the door 5, the weighted member should be placed on the disc 7, the weight of said member forcing the sleeve 17 downwardly on the post 13, the sleeve rotating through the path of travel of the ball 15 in the spiral groove 14. The door 5 carries at one side thereof a finger piece 19 whereby the door may be swung to an open position and this finger piece 19 is so positioned relative to the same housing 1 that the same will engage within the notch 20 formed in the wall of the housing at one side of the door opening 4 for retaining the door in an open position ready to receive a filled bottle of milk. As soon as the weight of the full bottle of milk rests upon the disc 7, the sleeve 17 will be moved downwardly on the post 13 for moving the door 5 to a closed position. In order to lock the door in a closed position, one edge of the door is provided with a notch 21 having an inclined portion 22 leading thereto over which the pivoted latch 23 rides for engagement within the notch 21. The inner end of the latch 23 has an enlarged portion 24 which surrounds the pivot of the latch and to which is attached an operating arm 25 movable through the guide 26 and provided with a transverse opening 27 at its upper end.

My improved locking mechanism comprises a dial 28, an indicator 29 which is movable through the dial and carried by a pin 30 slidably mounted in a portion of the housing. The inner end of the pin 30 carries a crank arm 31 having a stud 32 thereon which is adapted to be fitted into the opening 27 of the arm 25 whereby rotation of the pin 30 will raise and lower the arm, in order to disengage the latch 23 from the notch 21.

My improved locking mechanism is operated through the sleeve mechanism and in the present instance the number to which the indicator 20 must point on the dial is "6", and when the indicator is thus positioned, the locking device 32 will be in alignment with the opening 27 in the arm 25 whereby the pin 30 will be pushed inwardly through pressure exerted on the head 33 thereof against the tension of the spring 34, the lock will be engaged with the opening 27 and through rotation of the pin 30 the latch member 23 will be moved downwardly from the notch 21 permitting the door 5 to be opened for taking the filled bottle from the housing. When the door is opened, the finger piece 19 will be engaged in the recess 20 for retaining the door in an open position ready to receive the filled bottle.

It will be apparent from the foregoing that I have provided a simple and inexpensive device of the character described which will fully protect the filled bottle of milk from being removed by unauthorized persons.

While I have shown and described the preferred form of my invention, it will be obvious that various changes in the details of construction and in the proportions may be resorted to for successfully carrying my invention into practice without sacrificing any of the novel features of construction or departing from the scope of the appended claims.

Having thus described my invention, what I claim is:—

1. A device of the character descibed, including a housing having a door opening, a door for closing said opening, a supporting post in the bottom of the housing having a spiral groove, a sleeve mounted upon said post, a ball carried by the sleeve and movable in the groove whereby to rotate said sleeve upon downward movement of the same upon the post, a supporting disc mounted upon the upper end of the sleeve and having connection with the door whereby the application of a weight to said disc will rotate the same for moving said door to a closed position.

2. A device of the character described including a housing having a door opening, a door for closing said opening, a supporting post in the bottom of the housing having a spiral groove, a sleeve mounted upon said post, a ball carried by the sleeve and movable in the groove whereby to rotate said sleeve support upon downward movement of the same upon the post, a supporting disc mounted upon the upper end of the sleeve and having connection with the door whereby the application of a weight to said disc will rotate the same for moving said door to a closed position and means for locking said door and selective mechanism for actuating said locking means to release said door.

In testimony whereof I affix my signature.

JOSEPH LANGSTEINER.